(12) United States Patent
Green

(10) Patent No.: US 7,301,288 B2
(45) Date of Patent: Nov. 27, 2007

(54) LED BUCK REGULATOR CONTROL IC

(75) Inventor: Peter Green, Redondo Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 324 days.

(21) Appl. No.: 11/100,033

(22) Filed: Apr. 5, 2005

(65) Prior Publication Data

US 2005/0225259 A1 Oct. 13, 2005

Related U.S. Application Data

(60) Provisional application No. 60/560,874, filed on Apr. 8, 2004.

(51) Int. Cl.
*G05F 1/00* (2006.01)
(52) U.S. Cl. ............... 315/291; 315/224; 315/307; 323/282; 323/285
(58) Field of Classification Search ........... 315/209 R, 315/224–226, 291, 307–308, 246–247, 360 R, 315/360; 323/282, 285
See application file for complete search history.

(56) References Cited

U.S. PATENT DOCUMENTS

| 5,994,885 | A | * | 11/1999 | Wilcox et al. | ............... | 323/285 |
| 6,172,466 | B1 | * | 1/2001 | Ki et al. | ............... | 315/224 |
| 6,188,183 | B1 | * | 2/2001 | Greenwood et al. | ........ | 315/307 |
| 6,400,102 | B1 | * | 6/2002 | Ghanem | ............... | 315/291 |
| 6,885,176 | B2 | * | 4/2005 | Librizzi | ............... | 323/285 |
| 6,891,339 | B2 | * | 5/2005 | Ribarich et al. | ............ | 315/291 |
| 2004/0032223 | A1 | * | 2/2004 | Henry | ............... | 315/291 |
| 2004/0124818 | A1 | * | 7/2004 | Dequina et al. | ............ | 323/282 |
| 2005/0035748 | A1 | * | 2/2005 | Inn | ............... | 323/285 |

FOREIGN PATENT DOCUMENTS

| JP | 9-238464 | 9/1997 |
| JP | 2003-100489 | 4/2003 |
| JP | 2004-48011 | 2/2004 |
| JP | 2004-64994 | 2/2004 |

OTHER PUBLICATIONS

Notice of Reasons for Rejection issued Jul. 17, 2007 in the corresponding Japanese Application No. 2005-111169 with English language translation.

* cited by examiner

*Primary Examiner*—Douglas W. Owens
*Assistant Examiner*—Tung X Le
(74) *Attorney, Agent, or Firm*—Ostrolenk, Faber, Gerb & Soffen, LLP

(57) ABSTRACT

A high speed buck control IC for constant LED current regulation. A continuous mode hysteretically controlled buck regulator monitors the load current using an accurate on-chip band-gap voltage reference. This style of current regulation allows the designer to dispense with large and sometimes bulky output capacitors. The IC is inherently protected against short circuit conditions, and an additional circuit provides open circuit protection. An external high side bootstrap circuit aids in driving the buck switching element especially at high frequencies. A low side driver is also provided for use, e.g. in synchronous rectifier designs. All functions are realized within a small 8 pin DIP or SOIC package.

23 Claims, 6 Drawing Sheets

LED BUCK REGULATOR CONTROL IC

CROSS-REFERENCE TO RELATED APPLICATION

This application is based upon and claims priority of U.S. Provisional Application Ser. No. 60/560,874 filed Apr. 8, 2004, incorporated by reference.

BACKGROUND OF THE INVENTION

The present invention relates to a buck regulator control IC, and more particularly to a regulator for supplying precise constant current to a load, such as LEDs.

SUMMARY OF THE INVENTION

A high speed buck control IC for constant LED current regulation. A continuous mode hysteretically controlled buck regulator monitors the load current using an accurate on-chip band-gap voltage reference. This style of current regulation allows the designer to dispense with large and sometimes bulky output capacitors. The IC is inherently protected against short circuit conditions, and an additional circuit provides open circuit protection. An external high side bootstrap circuit aids in driving the buck switching element especially at high frequencies. A low side driver is also provided for use, e.g. in synchronous rectifier designs. All functions are realized within a small 8 pin DIP or SOIC package.

The invention has been implemented in the IRS2540 LED Buck Regulator Control IC, which is available from the International Rectifier Corp. The IRS2540 further includes a 600V half-bridge driver, micropower startup (150 µA), a 15.6 Zener clamp on Vcc, oscillator frequency up to 500 kHz, auto-restart, non-latched shutdown, PWM dimmable operation, and over-temperature protection.

Other features and advantages of the invention will be understood from the following description of an embodiment thereof, with reference to the drawings.

BRIEF DESCRIPTION OF THE DRAWING(S)

Figure 5A:
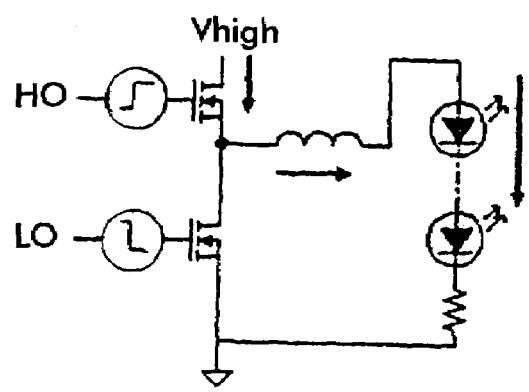
Figure 5B:
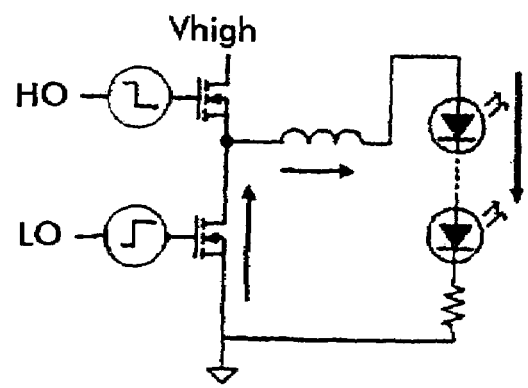
Figure 6:
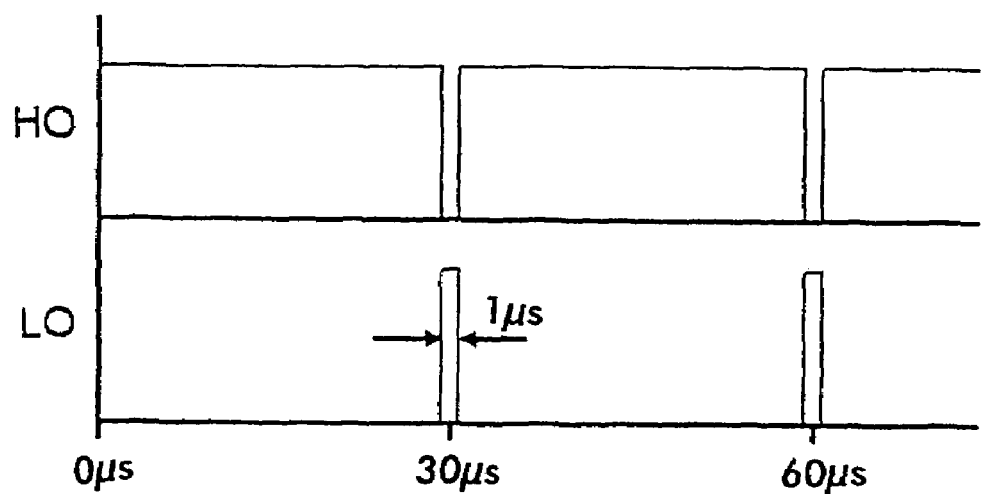
Figure 7:
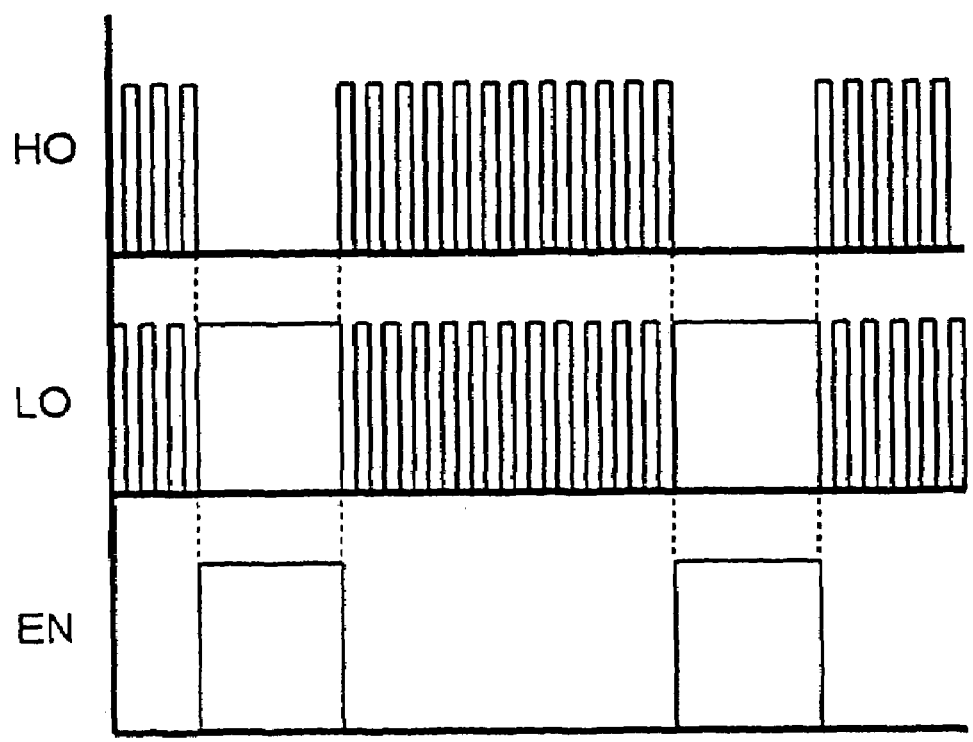
Figure 8:
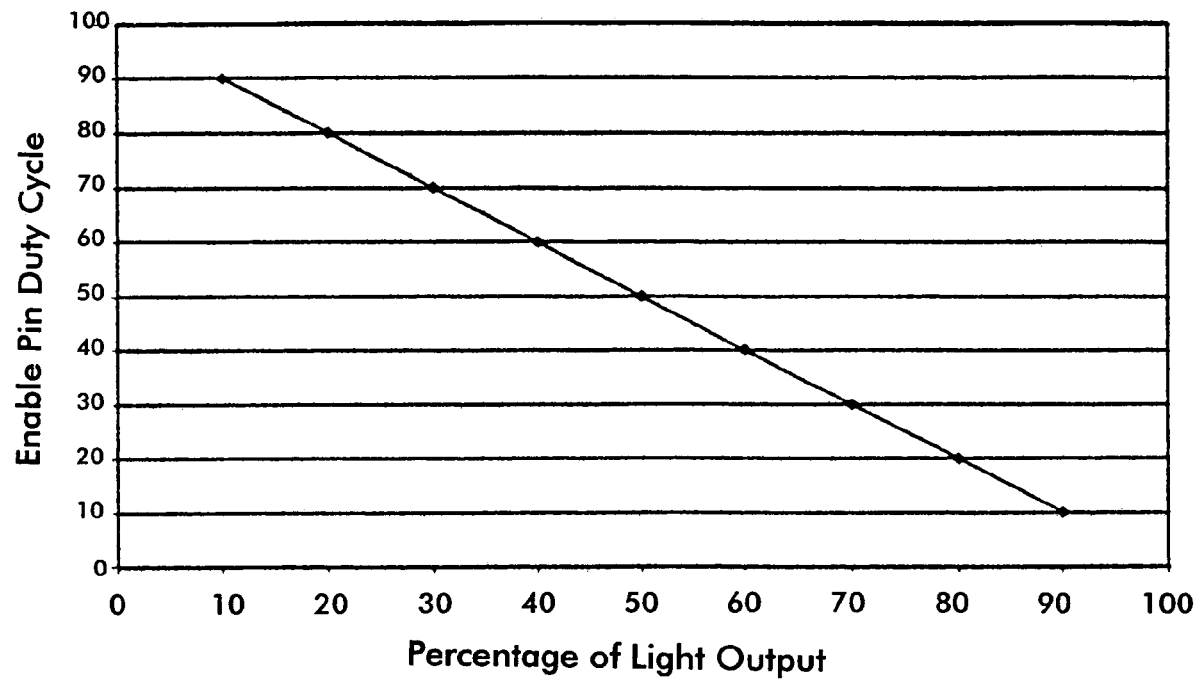

FIGS. 5(A) and 5(B) show respectively current paths when energy is being stored in and released from the inductor L1;

FIG. 6 shows the operation of the watchdog timer;

FIG. 7 is a graph showing dimming signals;

FIG. 8 is a graph showing light output vs. duty cycle at the enable pin EN; and

Figure 9:
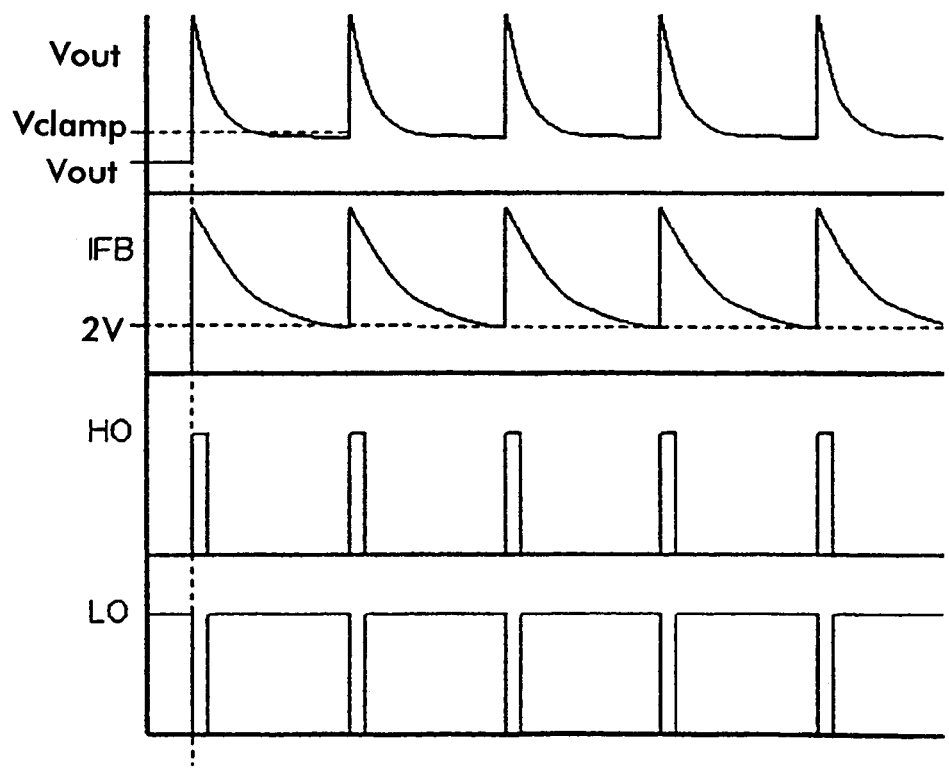

FIG. 9 is a graph showing open circuit fault signals; with clamp.

DETAILED DESCRIPTION OF EMBODIMENTS OF THE INVENTION

Figure 1:
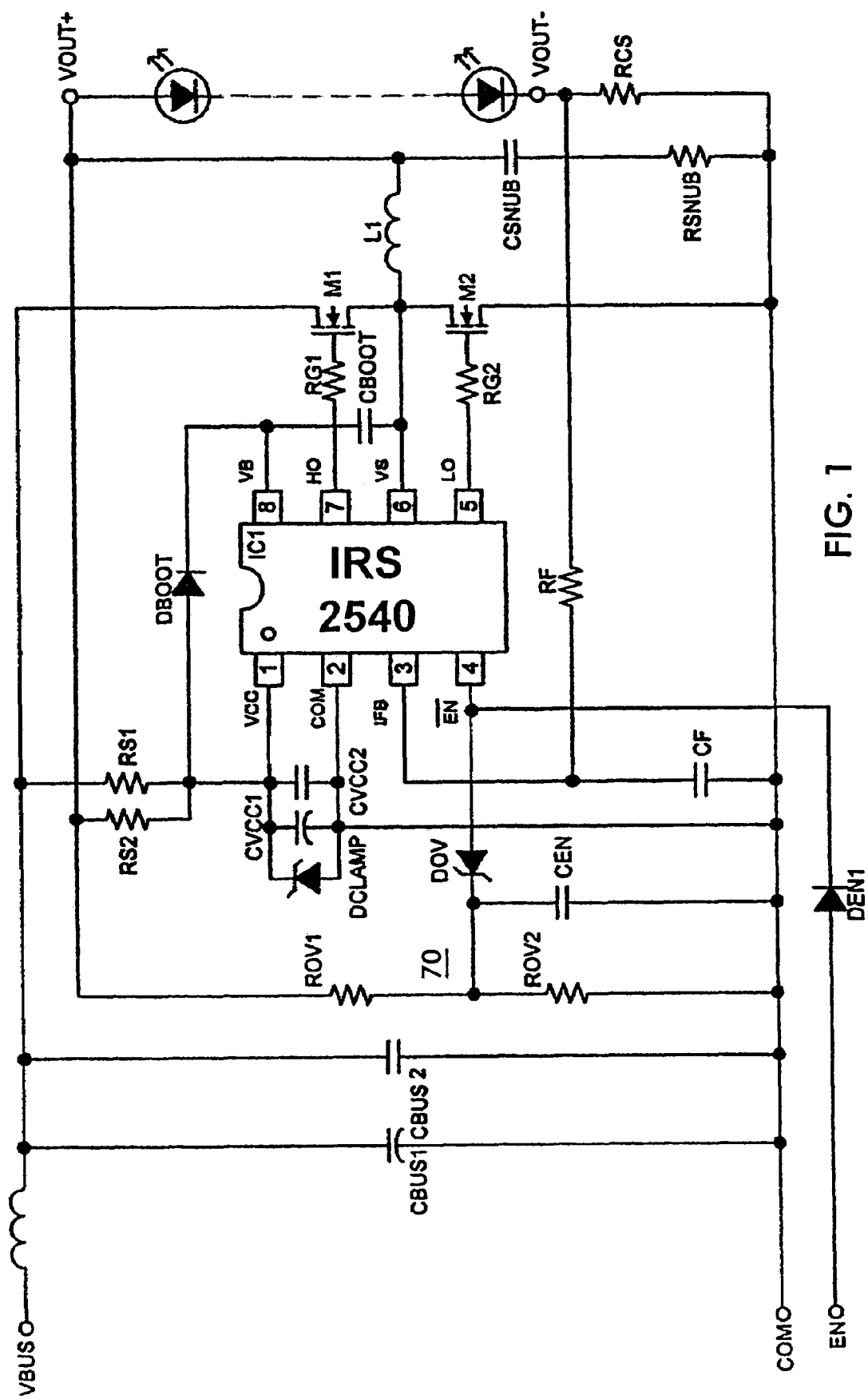
FIG. 1 is a circuit diagram showing a typical application of the IC.

FIG. 1 shows a typical application of the IRS2540 chip. High-side and low-side outputs HO and LO (see FIG. 2) drive a pair of MOSFETs M1, M2 in a half-bridge arrangement.

A bootstrap diode DBOOT receives the supply voltage VBUS via RS1 and provides it via the pin VB to the high-side driver 25, while charging the bootstrap capacitor CBOOT.

An inductor L1 provides energy storage for the buck function (discussed below).

Also discussed below in more detail is an open-circuit protection circuit 70 comprising resistors ROV1, ROV2, Zener diode DOV and capacitor CEN.

In the application shown, the circuit provides a regulated output voltage VOUT+ for driving one or a plurality of LEDs.

Operating Mode

The IRS2540 is capable of replacing a standard buck controller IC but has no need for an output capacitor. The disclosed style of current regulation allows the designer to dispense with the large and sometimes bulky conventional output capacitors. The control methodology is hysteresis-based, as opposed to the more traditional regulation of a steady state value.

During normal operating conditions, the output current is sensed as a voltage across RCS and fed back to the IFB pin. The output current will be regulated via the IFB pin voltage, which in this circuit has a nominal value of 500 mV with a hysteresis range of 100 mV. The feedback is compared to an internal high precision band gap voltage reference 50. In regards to the hysteresis control, the output current ripple (the hysteresis range) is predetermined and set internally. The hysteresis rail to rail limits have been chosen large enough to offer noise immunity, while at the same time, small enough to minimize the output current ripple. In addition to this highly robust style of control, an on-board dv/dt filter is also included to prevent additional erroneous transitioning.

Once the supply voltage VBUS becomes sufficient, the LO output is held high and the HO output low for a predetermined period of time. This initiates charging of the bootstrap capacitor CBOOT, establishing the VB/VS floating supply for proper high side operation once switching begins. The chip will then begin toggling the HO and LO outputs as needed to regulate the current. There is no preset operating frequency or duty cycle. Both parameters are continuously changable to achieve constant current regulation. The values of Iout(+), Iout(−), and Iout(avg) can be calculated as follows:

$$Iout(+)=550 \text{ m}V/R_{sense}; Iout(-)=450 \text{ m}V/R_{sense}$$

$$Iout(avg)=(Iout(+)+Iout(-))/2$$

Roughly 200 ns of deadtime has been introduced between the two gate drive signals to prevent a "shoot through" condition. Since this chip is designed to operate at higher frequencies, the switching losses are reduced by this deadtime. The gate delay has been minimized to maintain precise current regulation, while still offering an outlet to switching losses. Since the chip is hysteresis based, all on-chip delays affect the overall accuracy of current regulation and are kept to a minimum.

Watchdog Timer

During an open circuit condition, in the absence of protection, the HO output would theoretically remain high at all times. This lack of feedback poses a problem for the bootstrap capacitor CBOOT. If the HO output were to remain high indefinitely, the charge stored on the bootstrap capacitor CBOOT would slowly leak until reaching zero, thus eliminating the floating power supply VB for the high side driver 25. To maintain sufficient charge on CBOOT, a watchdog timer 60 (FIG. 2) has been implemented. In the condition of an open circuit, the HO output will be forced low after 30 μs and the LO output forced high. See FIG. 6. This toggling of the outputs will last for 1 μs to maintain and replenish sufficient charge on the bootstrap capacitor.

Bootstrap Capacitor and Diode

Criteria for selecting the bootstrap capacitor CBOOT and diode DBOOT will now be discussed. A major limiting factor for the bootstrap capacitor, is the 30 μs time period that governs the watchdog timer. The purpose of the watchdog timer is to maintain sufficient charge on the bootstrap capacitor. If the component value is too small, the charge will fully dissipate in less than 30 μs, negating the purpose of the timer. In most situations, this constraint will suggest a cap of no less than 100 nF. A larger value may be used if desired.

The bootstrap diode DBOOT should be at least a fast recovery, if not an ultrafast recovery component, to maintain good efficiency. Since the cathode of the boot diode will be switching between COM and roughly the high side voltage, the reverse recovery time of this diode is important. If the application voltage is low enough, a Schottky diode may be the diode of choice, due to its inherent lack of a reverse recovery time. For additional information concerning the bootstrap components, refer to Design Tip DT 98-2, "Bootstrap Component Selection For Control ICs" by Jonathan Adams, available at www.irf.com, the contents of which are incorporated by reference.

Enable Pin

The enable pin EN (see FIGS. 1-2) serves as a multi-function control element for both dimming and open-circuit protection. When the enable pin is held low, the chip remains in a fully functional state with no alterations to the operating environment. To disable the control feedback and regulation, a voltage ≧2V is applied to the enable pin. With the chip in a disabled state, the output HO will remain low, whereas the output LO will remain high to prevent VS from floating in addition to maintaining charge on the bootstrap capacitor. This 2V threshold for disabling the IRS2540 is advantageous to enhance immunity to any externally generated noise, or application ground noise.

Dimming Mode

To achieve dimming, a signal with constant frequency and a selected duty cycle may be fed into the enable pin EN (see FIG. 7). The EN pin can also be used to switch the LEDs on and off at high speed to produce animation effects.

There is a direct linear relationship between the average load current and duty cycle of the dimming signal. If the duty cycle ratio is 50%, then 50% of the maximum set light output will be realized. Likewise if the ratio is 30%, 70% of the maximum set light output will be realized. The frequency of the dimming signal is chosen to avoid a flashing or possibly a "strobe light" effect. A signal on the order of a few kHz should be sufficient.

The minimum amount of dimming achievable (light output approaches 0%) will be determined by the "on" time of the HO output, when in a fully functional regulating state. To maintain reliable dimming, it is recommended to keep the "off" time of the enable signal at least 10 times that of the HO "on" time. For example, if the application is running at 500 kHz with an input voltage of 400V and an output voltage of 100V, the HO "on" time will be 500 ns (one-fourth of the period—see calculations below). This will set the minimum "off" time of the enable signal to 5 μs.

$$\text{Duty Cycle} = \frac{V_{out}}{V_{in}} * 100 = \frac{100 \text{ V}}{400 \text{ V}} * 100 = 25\%$$

$$HO_{on\ time} = 25\% * \frac{1}{500 \text{ kHz}} = 500 \text{ ns}$$

Open Circuit Protection Mode

By using the voltage divider ROV1, ROV2, cap CEN, and Zener diode DOV, the output voltage can be clamped at virtually any desired value. The output clamp 70 will prevent the positive output terminal VOUT+ from floating at the high side input voltage.

In open circuit condition the output voltage cannot be held for an infinite amount of time. Because of this, switching will still occur between the HO and LO outputs, whether due to the output voltage clamp 70 or the watchdog timer 60. In this state, rather than regulating the current with the feedback pin IFB, the output voltage will be regulated via the enable pin EN. Transients and switching can and will be observed at the positive output terminal as seen in FIG. 9. The difference in signal shape, between the output voltage and the IFB, is due to the capacitor CEN used to form the voltage clamp 70. The repetition of the spikes can be reduced by increasing the cap size.

The two resistors ROV1, ROV2 form a voltage divider for the output VOUT+, which is then fed into the anode of the Zener diode DOV. The diode will conduct, flooding the enable pin, only when its nominal voltage is exceeded. The chip will enter a disabled state once the divider network produces a voltage at least 2V greater than the Zener rating. The capacitor CEN serves to filter and slow the transients/switching observed at the positive output terminal. The designer can determine the clamped output voltage using the following analysis. The choice of capacitor is at the designer's discretion.

$$V_{out} = \frac{(2V + DZ)(R_1 + R_2)}{R_2}$$

DZ = Zener Diode Nominal Rated Voltage

Under-Voltage Lock-Out Mode

Figure 2:
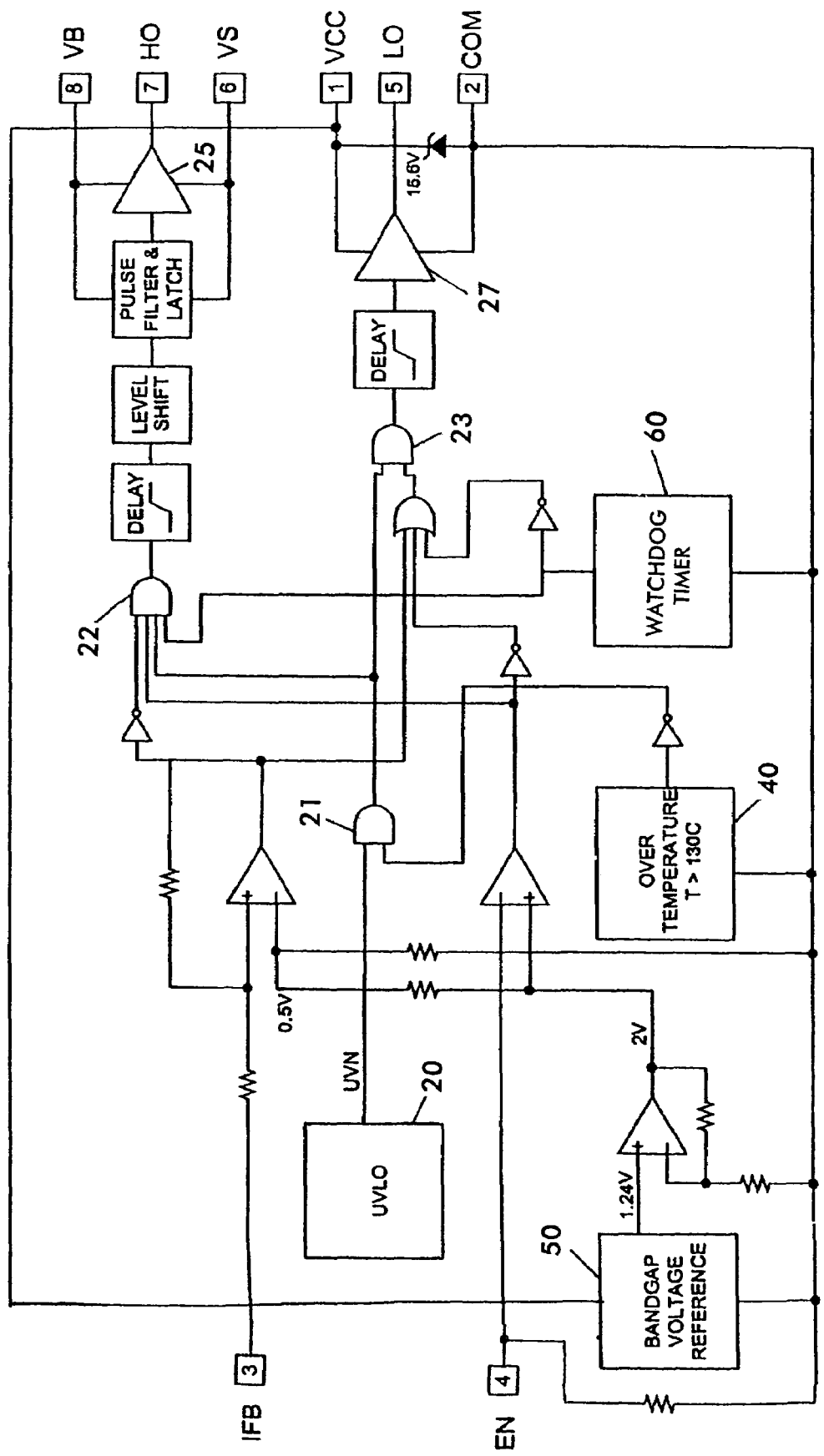
FIG. 2 is a functional block diagram of the IC.
Figure 3:
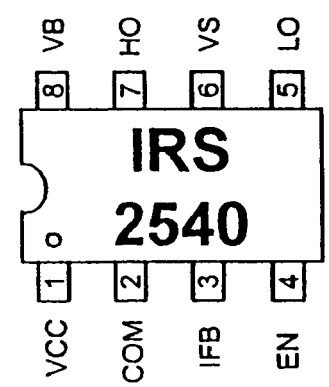
FIG. 3 is a table showing pin assignments in the IC.
Figure 4:
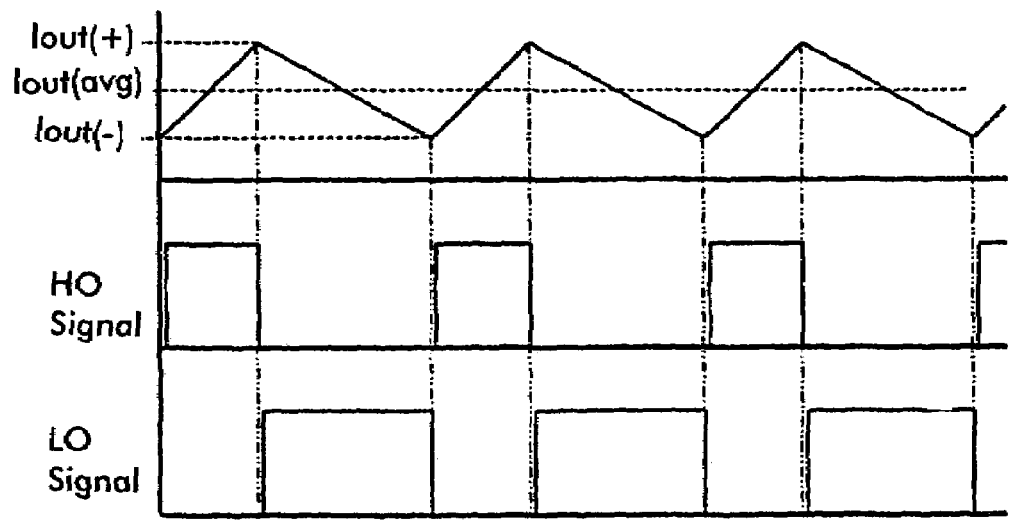
FIG. 4 is a graph showing control signals.

Referring to FIGS. 1 and 2, the under-voltage lock-out mode (UVLO) is defined as the state the IRS2540 is in when Vcc is below the turn-on threshold of the IC. During startup conditions, if the chip supply VBUS proves insufficient, less than Vccuv+, the IRS2540 will enter the UVLO mode. In one embodiment of the invention Vccuv+ may be about 10.5 to 12.5 volts, or preferably about 11.5 volts. This state is very similar to when the chip has been disabled via control signals. The UVLO circuit 20, via the gates 21, 22, 23, controls the high side driver 25 and the low side driver 27. The output HO will remain low, while the output LO will be held high to prevent floating of VS, in addition to maintaining charge on the bootstrap capacitor CBOOT (FIG. 1). When VBUS increases to Vccuv+, the chip enters a normal operation mode. If already in normal operation, the chip will not enter UVLO unless the supply voltage falls to Vccuv−. In the disclosed embodiment, Vccuv− may be about 8.5 to 10.5 volts, or preferably about 9.5 volts.

Over Temperature Mode

If the chip senses an ambient temperature in excess of 130 C, the over-temperature circuit 40 places the chip in the same state as the UVLO mode, again via the gates 21, 22, 23. The HO output will remain low, while the LO output will be held high to prevent floating of VS in addition to maintaining charge on the bootstrap capacitor CBOOT. Normal operation will commence once the sensed ambient temperature falls below 130 C and Vcc again rises through Vccuv+, thereby terminating the UVLO mode.

Although embodiments of the invention have been described, the invention is not limited to such embodiments, but extends to such modifications and variations as might occur to one having ordinary skill in the art.

What is claimed is:

1. A buck power supply circuit for providing regulated current to a load, comprising:
    first and second switching devices connected in series in a half-bridge arrangement;
    first and second drivers for said first and second switching devices, respectively;
    an inductor connected at one end to a connection point between said first and second switching devices and at the other end providing an output voltage to said load;
    a feedback circuit connected to said load for providing a feedback voltage representative of output current in said load;
    a comparator connected to both of said first and second drivers through a logic network, providing hysteretic control of said drivers such that said output voltage to said load and thereby said load current is maintained between upper and lower limits, said feedback voltage being fed back to said comparator for establishing said upper limit of said output voltage;
    a reference voltage circuit connected to said comparator for establishing said lower limit of said output voltage; and
    an enable circuit connected to said comparator for receiving an enable signal, said enable circuit being operable for setting said output voltage at a selected value.

2. The circuit of claim 1, wherein said load comprises at least one LED.

3. The circuit of claim 1, wherein said reference voltage circuit is a bandgap voltage reference circuit.

4. The circuit of claim 1, wherein said enable circuit is responsive to said enable signal for regulating the duty cycle of said output voltage.

5. The circuit of claim 4, wherein said load comprises at least one LED, and said enable circuit is operable for dimming said at least one LED.

6. The circuit of claim 4, wherein said load comprises at least one LED, and said enable circuit is operable for high-speed switching of said at least one LED to produce an animation effect.

7. The circuit of claim 1, wherein said enable circuit is responsive to said enable signal for clamping said output voltage at a selected value.

8. The circuit of claim 1, further comprising an open circuit detecting circuit which receives said output voltage and, when said output voltage exceeds a predetermined value, supplies a clamping signal to said enable circuit.

9. The circuit of claim 8, wherein said open circuit detecting circuit comprises a voltage divider, and a Zener diode connected to said enable circuit, wherein said Zener diode conducts in response to a selected output voltage of said voltage divider, thereby supplying said clamping signal.

10. The circuit of claim 1, wherein said first and second drivers, comparator, logic network and reference voltage circuit are provided on a single semiconductor chip.

11. The circuit of claim 10, wherein said enable circuit is connected to a single pin of said chip, thereby providing one-pin control of both output duty cycle and output clamping.

12. A buck power supply circuit for providing regulated current to a load, comprising:
    first and second switching devices connected in series in a half-bridge arrangement;
    first and second drivers for said first and second switching devices, respectively;
    an inductor connected at one end to a connection point between said first and second switching devices and at the other end providing an output voltage to said load;
    a feedback circuit connected to said load for providing a feedback voltage representative of output current in said load;
    a comparator connected to both of said first and second drivers through a logic network, providing hysteretic control of said drivers such that said output voltage to said load and thereby said load current is maintained between upper and lower limits, said feedback voltage being fed back to said comparator for establishing said upper limit of said output voltage;
    a reference voltage circuit connected to said comparator for establishing said lower limit of said output voltage; and
    a watchdog timer circuit responsive to said output voltage which, when said output voltage exceeds a predetermined value for a first predetermined time, issues signals to said first and second drivers for a second predetermined time.

13. A method of providing regulated current to a load, comprising the steps of:
    connecting first and second switching devices in series in a half-bridge arrangement;
    providing first and second drivers for said first and second switching devices, respectively;
    connecting an inductor at one end to a connection point between said first and second switching devices and at the other end of said inductor providing an output voltage to said load;
    connecting a feedback circuit to said load for providing a feedback voltage representative of output current in said load;
    providing a pair of parallel comparators, both being connected to both of said first and second drivers through a logic network, thereby providing hysteretic control of said drivers such that said output voltage to said load and thereby said load current is maintained between upper and lower limits;
    feeding back said feedback voltage to one of said comparators for establishing said upper limit of said output voltage;
    connecting a reference voltage circuit to both of said comparators for establishing said lower limit of said output voltage; and
    providing an enable circuit connected to one of said comparators for receiving an enable signal, said enable circuit being operable for setting said output voltage at a selected value.

14. The method of claim 13, wherein said load comprises at least one LED.

15. The method of claim 13, wherein said reference voltage circuit is a bandgap voltage reference circuit.

16. The method of claim 13, further comprising the step of regulating the duty cycle of said output voltage by regulating said enable signal to said enable circuit.

17. The method of claim 16, wherein said load comprises at least one LED, and said regulating step includes the step of dimming said at least one LED.

18. The method of claim 16, wherein said load comprises at least one LED, and said regulating step includes the step of switching said Led at high speed to produce an animation effect.

19. The method of claim 13, further comprising the step of clamping said output voltage at a selected value by providing said enable signal to said enable circuit.

20. The method of claim 13, further comprising the step of detecting an open circuit at said load by receiving said output voltage and, when said output voltage exceeds a predetermined value, supplying a clamping signal to said enable circuit.

21. The method of claim 20, wherein said output voltage is received by an open circuit detecting circuit comprising a voltage divider, and a Zener diode connected to said enable circuit, wherein said Zener diode conducts in response to a selected output voltage of said voltage divider, thereby supplying said clamping signal.

22. The method of claim 13, further comprising a step of providing said first and second drivers, comparators, logic network and reference voltage circuit on a single semiconductor chip and wherein said enable signal is provided to a single pin of said chip, thereby performing one-pin control of both output duty cycle and output clamping.

23. A method of providing regulated current to a load, comprising the steps of:

connecting first and second switching devices in series in a half-bridge arrangement;

providing first and second drivers for said first and second switching devices, respectively;

connecting an inductor at one end to a connection point between said first and second switching devices and at the other end of said inductor providing an output voltage to said load;

connecting a feedback circuit to said load for providing a feedback voltage representative of output current in said load;

providing a pair of parallel comparators, both being connected to both of said first and second drivers through a logic network, thereby providing hysteretic control of said drivers such that said output voltage to said load and thereby said load current is maintained between upper and lower limits, feeding back said feedback voltage to one of said comparators for establishing said upper limit of said output voltage;

connecting a reference voltage circuit to both of said comparators for establishing said lower limit of said output voltage; and timing said output voltage by a watchdog timer circuit responsive to said output voltage, and, when said output voltage exceeds a predetermined value for a first predetermined time, issuing signals to said first and second drivers for a second predetermined time.

* * * * *